(12) United States Patent
Yamamoto et al.

(10) Patent No.: US 8,596,038 B2
(45) Date of Patent: Dec. 3, 2013

(54) LIQUID PROPELLANT TANK AND VAPOR JET EMITTING DEVICE INCLUDING SAME

(75) Inventors: Takayuki Yamamoto, Sagamihara (JP); Osamu Mori, Sagamihara (JP); Yoshihiro Kishino, Tokyo (JP); Masayuki Tamura, Tokyo (JP); Shohei Koga, Tokyo (JP); Ryoji Imai, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 435 days.

(21) Appl. No.: 13/039,859

(22) Filed: Mar. 3, 2011

(65) Prior Publication Data

US 2011/0214408 A1 Sep. 8, 2011

(30) Foreign Application Priority Data

Mar. 4, 2010 (JP) ................................. 2010-048223

(51) Int. Cl.
*F02K 9/00* (2006.01)

(52) U.S. Cl.
USPC .................. 60/257; 60/250; 60/251; 60/263; 62/45.1

(58) Field of Classification Search
USPC ............. 60/257, 259, 250, 251, 263; 62/45.1
See application file for complete search history.

(56) References Cited

U.S. PATENT DOCUMENTS

| 3,222,498 A | | 12/1965 | Miksch | |
|---|---|---|---|---|
| 3,854,905 A | | 12/1974 | Balzer et al. | |
| 5,279,323 A | * | 1/1994 | Grove et al. | 137/154 |
| 5,823,478 A | * | 10/1998 | Dunn | 244/171.1 |
| 5,901,557 A | * | 5/1999 | Grayson | 62/45.1 |

FOREIGN PATENT DOCUMENTS

| EP | 2101056 | 9/2009 |
|---|---|---|
| JP | 08011799 | 1/1996 |
| JP | 2009214695 A | 9/2009 |
| WO | 2006-106204 | 10/2006 |

OTHER PUBLICATIONS

European Search Report issued on May 25, 2011 in counterpart European Patent Application No. 11156832.5.

* cited by examiner

*Primary Examiner* — Gerald L Sung
*Assistant Examiner* — Craig Kim
(74) *Attorney, Agent, or Firm* — Volpe and Koenig, P.C.

(57) ABSTRACT

A liquid propellant tank for storing a liquid propellant A and supplying vapor produced by evaporation of part of the liquid propellant A to an external location comprises a tank body for storing the liquid propellant A, and a plurality of holder plates arranged inside the tank body, around an axis L of the tank body. The holder plates cause the liquid propellant A to adhere to them by surface tension, thereby establishing, inside the tank body, a liquid propellant holding area LA in which the liquid propellant A is held and a gas accumulation area GA in which vapor produced by evaporation of part of the liquid propellant A accumulates. The tank body has a propellant inlet open into the liquid propellant holding area LA and a gas outlet open into the gas accumulation area GA.

2 Claims, 2 Drawing Sheets

LIQUID PROPELLANT TANK AND VAPOR JET EMITTING DEVICE INCLUDING SAME

BACKGROUND OF THE INVENTION

1. Field of the Invention

This invention relates to a liquid propellant tank mounted on, for example a spacecraft such as an artificial satellite to store a liquid propellant and supply vapor produced by evaporation of part of the liquid propellant to an external location, and a vapor jet emitting device for producing thrust by emitting a jet of the vapor supplied from the liquid propellant tank.

2. Description of the Related Art

A liquid propellant tank of this type constituting the prior art is disclosed in Japanese Patent Application Preliminary Publication No. 2009-214695, for example.

The liquid propellant tank disclosed therein comprises a tank body for storing a liquid propellant, foamed metal filling approximately the whole interior of the tank body, and a heater surrounding the tank body. The tank body has a gas outlet. The tank body stores the liquid propellant in a state that the liquid propellant is held in pores of the foamed metal.

This liquid propellant tank is designed to cause evaporation of part of the liquid propellant in the tank body by heating with the heater. A vapor jet emitting device including this liquid propellant tank is designed to supply vapor produced inside the tank body, to a thruster connected to the gas outlet, so that the thruster can produce thrust by emitting a vapor jet.

The aforementioned prior-art liquid propellant tank with weighty foamed metal filling approximately the whole interior of the tank body can store the liquid propellant in a state that it is held in pores of the foamed metal, but cannot be lightweight.

Further, the aforementioned prior-art liquid propellant tank requires that heat be transferred to the whole mass of the foamed metal by heating with the heater in order to cause evaporation of part of the liquid propellant, and thus, requires a much greater amount of external thermal energy than otherwise. These are the problems with the prior art to which a solution is sought.

SUMMARY OF THE INVENTION

The present invention has been made in consideration of the above problems. An object of the present invention is to provide a liquid propellant tank which is lightweight and capable of supplying only vapor produced by evaporation of a liquid propellant to an external location, and requires very little external thermal energy, and a vapor jet emitting device including such liquid propellant tank.

The present invention provides a liquid propellant tank for storing a liquid propellant and supplying vapor produced by evaporation of part of the liquid propellant to an external location, comprising a tank body for storing the liquid propellant, and a plurality of holder plates arranged inside the tank body to cause the liquid propellant to adhere to them by surface tension, thereby establishing, inside the tank body, a liquid propellant holding area in which the liquid propellant is held and a gas accumulation area in which vapor produced by evaporation of part of the liquid propellant accumulates, the tank body having a propellant inlet open into the liquid propellant holding area and a gas outlet open into the gas accumulation area.

The features of the present invention described above provide an excellent effect that the liquid propellant tank can be lightweight and supply only vapor produced by evaporation of the liquid propellant to an external location, and requires no external thermal energy.

Preferably, the holder plates are arranged at intervals determined on the basis of tank size, properties of the liquid propellant, such as surface tension, and acceleration environment of a spacecraft on which the liquid propellant tank is to be mounted on.

Such holder plates provide an excellent effect that the liquid propellant is held efficiently to ensure the establishment of the gas accumulation area.

The present invention also provides a vapor jet emitting device for producing thrust by emitting a jet of vapor produced from a liquid propellant, comprising a liquid propellant tank of the type described above, and a thruster connected to the gas outlet of the tank body of the liquid propellant tank by a gas supply line to emit a jet of vapor produced inside the tank body and supplied through the gas outlet, the gas supply line between the tank body and the thruster being kept at higher temperature than temperature inside the tank body.

The features of the present invention described above provide an excellent effect that the vapor jet emitting device can be a lightweight and simple system as a whole.

In the liquid propellant tank according to the present invention, the tank body may be made of a material such as aluminum or SUS (stainless used steel), and the holder plates may be flat plates of a lightweight metal such as aluminum. The materials for the tank body and the holder plates may however be chosen freely.

The liquid propellant to be stored in the tank body of the liquid propellant tank according to the present invention may be chosen from those which easily evaporate without heating. It may be isobutene, which is a liquefied petroleum gas, or an alternative for chlorofluorocarbon, such as HFC-134a, for example. HFC-134a is however preferable, because it is non-flammable and atoxic, and does not cause corrosion of the tank body and the holder plates.

In the liquid propellant tank according to the present invention, the holder plates arranged inside the tank body cause the liquid propellant to adhere to them by surface tension, thereby establishing, on the propellant inlet side, a liquid propellant holding area in which the liquid propellant is held. As a result, a gas accumulation area in which vapor produced by evaporation of part of the liquid propellant accumulates is established on the gas outlet side. This enables supply of only vapor produced by evaporation of the liquid propellant to an external location.

Further, the liquid propellant tank according to the present invention, which does not require that foamed metal fill approximately the whole interior of the tank body, can be lightweight.

Further, the liquid propellant tank or the vapor jet emitting device according to the present invention, which utilizes the phenomenon that the liquid propellant adheres to the holder plates by surface tension, can be mounted on spin-stabilized satellites and 3-axis stabilized satellites placed in the microgravity environment. The liquid propellant tank to be mounted on a spin-stabilized satellite is desirably designed such that the holder plates are arranged around the axis of the tank body to be aligned with the spin axis of the spin-stabilized satellite, at appropriate intervals.

The vapor jet emitting device according to the present invention does not require a gas accumulator or a combustion device, and thus, can be a more lightweight and simpler system than otherwise.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

With reference to the drawings attached, a liquid propellant tank and a vapor jet emitting device according to the present invention will be described below.

Figure 1:
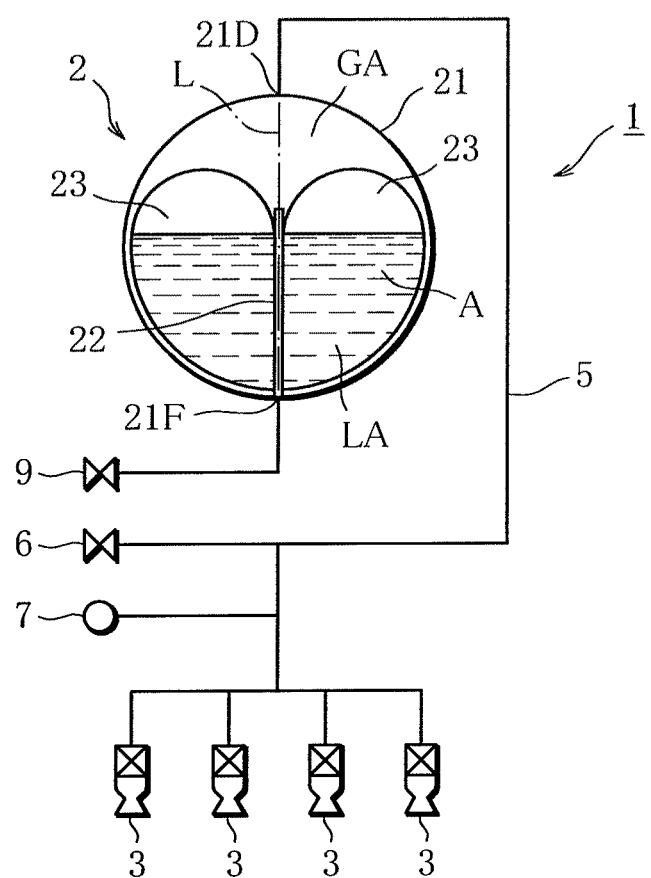
FIG. 1 is a schematic diagram illustrating the configuration of a vapor jet emitting device including a liquid propellant tank, according to an embodiment of the present invention; and, FIG. 2 is a perspective view showing the interior of a tank body of the liquid propellant tank of FIG. 1, with a portion of its exterior removed for illustrative purposes.
Figure 2:
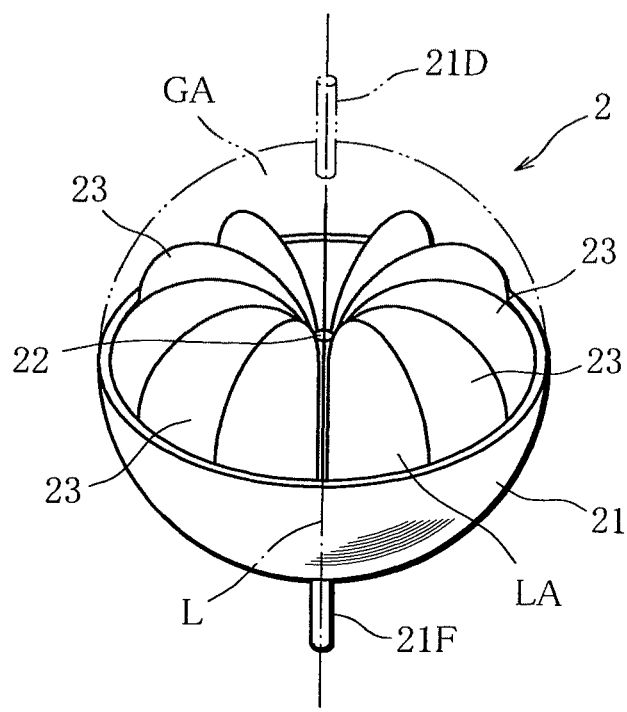

FIGS. 1 and 2 show a vapor jet emitting device including a liquid propellant tank according to an embodiment of the present invention. Here, the embodiment of the present invention will be described with an example in which a vapor jet emitting device including a liquid propellant tank is mounted on a spin-stabilized satellite.

As seen in FIG. 1, a vapor jet emitting device 1 comprises a liquid propellant tank 2 and a plurality of thrusters 3 as main components.

The liquid propellant tank 2 includes a spherical tank body 21 for storing a liquid propellant A. The tank body 21 is made of aluminum and has an axis L to be aligned with a spin axis of the spin-stabilized satellite.

The tank body 21 has a support member 22 and a plurality of holder plates 23 inside.

The support member 22 is fixed to the bottom of the tank body 21, in alignment with the axis L, where the term "bottom" is used with respect to the liquid propellant tank shown in FIG. 1. The spin-stabilized satellite is launched with the liquid propellant tank arranged with this bottom side down.

As seen in FIG. 2, the holder plates 23 are arranged around the support member 22 and fixed to the tank body 21 by means of the support member 22. In the present embodiment, the holder plates 23 are aluminum flat plates 1 mm thick, and arranged at intervals of 30°.

The holder plates 23 are designed to cause the liquid propellant A to adhere to their surfaces by surface tension, thereby holding the liquid propellant A between them. Thus, inside the tank body 21, an area provided with the holder plates 23 (tank body 21 bottom side area in FIG. 1; the spin-stabilized satellite is launched with this bottom side down) is established as a liquid propellant holding area LA, and an area not provided with the holder plates 23 (tank body 21 top side area in FIG. 1; the spin-stabilized satellite is launched with this top side up) is established as a gas accumulation area GA.

The tank body 21 has a gas outlet 21D open into the gas accumulation area GA, and a propellant inlet 21F open into the liquid propellant holding area LA.

In the vapor jet emitting device 1, the thrusters 3 are connected to the gas outlet 21D of the tank body 21 of the liquid propellant tank 2 by piping 5. On the piping 5, or gas supply line, a liquid introduction/discharge valve 6 and a pressure meter 7 are fitted. By keeping the piping 5 always at higher temperature than the temperature inside the tank body 21, vapor discharging through the gas outlet 21D is prevented from becoming liquefied in the piping 5.

Reference character 9 in FIG. 1 indicates a liquid introduction/discharge valve to allow a flow to or from the propellant inlet 21F.

As stated above, in the liquid propellant tank 2 according to the present embodiment, the holder plates 23 arranged inside the tank body 21 cause the liquid propellant A to adhere to them by surface tension, thereby establishing, on the propellant inlet 21F side, a liquid propellant holding area LA in which the liquid propellant A is held, and on the gas outlet 21D side, a gas accumulation area GA in which vapor produced by evaporation of part of the liquid propellant A accumulates. This enables only the vapor produced by evaporation of the propellant A to be supplied to the thrusters 3.

Unlike the prior art, the liquid propellant tank does not need to contain foamed metal filling approximately the whole interior of the tank body, resulting in a great reduction in weight as compared with the prior art.

Further, the vapor jet emitting device 1 according to the present embodiment does not require a gas accumulator or a combustion device, and thus, can be a more lightweight and simpler system than otherwise.

In the above, an embodiment of the present invention has been described with an example in which a vapor jet emitting device including a liquid propellant tank is mounted on a spin-stabilized satellite. The application of the present invention is however not limited to this. A propellant tank or a vapor jet emitting device according to the present invention can be mounted on a 3-axis satellite.

The configuration of the liquid propellant tank or the vapor jet emitting device according to the present invention is not limited to the described embodiment.

What is claimed is:

1. A vapor jet emitting device including a liquid propellant tank storing a liquid propellant, for producing thrust by emitting a jet of vapor of the liquid propellant supplied from the liquid propellant tank and produced by evaporation of part of the liquid propellant, the liquid propellant tank includes:

a tank body for storing the liquid propellant, and, a plurality of holder plates arranged inside the tank body to cause the liquid propellant to adhere to them by surface tension, thereby establishing, inside the tank body, a liquid propellant holding area in which the liquid propellant is held and a gas accumulation area in which vapor produced by evaporation of part of the liquid propellant accumulates, the tank body has a propellant inlet opening into the liquid propellant holding area and a gas outlet for supplying the vapor to an external location from the gas accumulation area, the gas outlet is connected to a thruster for emitting a jet of the vapor produced inside the tank body and supplied via the gas outlet, and a gas supply line connecting between the tank body and the thruster is kept at higher temperature that temperature inside the tank body.

2. The vapor jet emitting device according to claim 1, wherein the holder plates are arranged at intervals determined on the basis of tank size, properties of the liquid propellant, and acceleration environment.

* * * * *